July 9, 1963 F. C. GUIDA 3,097,290
ELECTRIC WELDING TORCH
Filed Jan. 2, 1962

INVENTOR.
FRANK C. GUIDA
BY Morse T Altman
ATTORNEYS

United States Patent Office 3,097,290
Patented July 9, 1963

3,097,290
ELECTRIC WELDING TORCH
Frank C. Guida, 144 Harryel St., Pittsfield, Mass.
Filed Jan. 2, 1962, Ser. No. 163,540
3 Claims. (Cl. 219—75)

This invention relates to an electric welding torch having a non-consumable electrode, the welding material being extraneously fed to the arc which is maintained between the electrode and the work. Although the material of the electrode is not welding material, yet the tip thereof from which the arc extends is gradually consumed so that when the torch is used continuously through a working day, it is usually necessary to adjust the electrode three or four times during the day so that it will project a suitable distance beyond the end of the casing in which it is housed. To make such an adjustment for the standard torch, it is necessary to disassemble it in part and then to reassemble it, this procedure taking considerable time which is lost production time. According to the present invention an electric welding torch is provided having a cap at its upper end which can be turned to force the electrode down against the pressure of a spring so that the electrode can be quickly and easily adjusted downward or upward without having to interrupt the operation of the torch.

Figure 2:
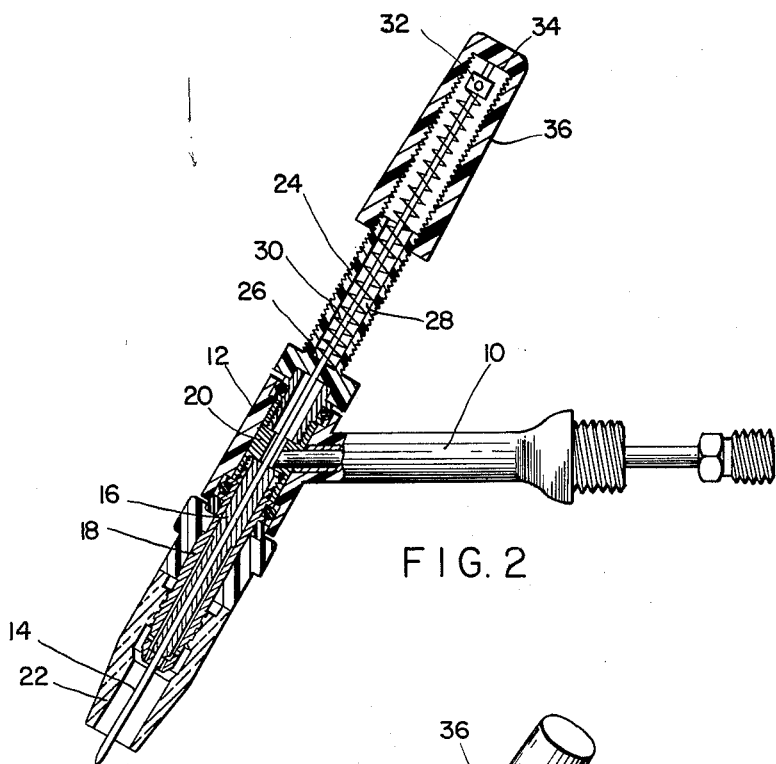
Figure 1:
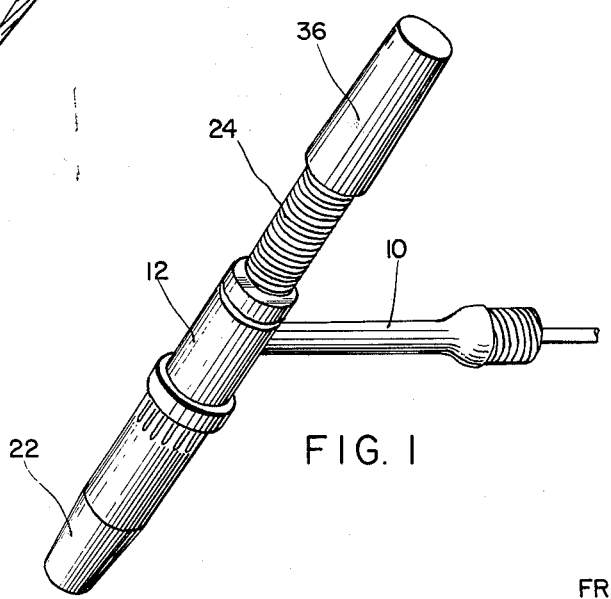

For a more complete understanding of the invention, reference may be had to the following description thereof, and to the drawing, of which FIGURE 1 is a perspective view of an electric welding torch embodying the invention; and FIGURE 2 is a longitudinal section of the torch shown in FIGURE 1.

The torch illustrated on the drawing is for the most part of standard construction and is of the gas-shielded type whereby a stream of inert gas such as argon or helium is supplied through a handle 10 which projects at an angle from the barrel 12 in which a non-consumable electrode 14 of tungsten is mounted. Within the lower part of the barrel is a collet 16 which can be caused to grip the electrode by turning the metal sleeve 18 surrounding the collet, the upper end of the sleeve being threaded into a fixed metal piece 20 as well known in the art. A ceramic gas cup 22 is screwed onto the lower end of the metal sleeve to direct the stream of gas to the tip of the electrode so as to shield the arc.

The upper portion 24 of the barrel is externally screw-threaded and is open at its upper end. At the bottom 26 of this portion 24 is a hole just large enough to receive the electrode 14. Above the bottom 26 a bore 28 extends to the upper end of the portion 24, this bore being large enough to house a helical spring 30 which may, if desired, be coated with insulation. The lower end of this spring is seated on the bottom 26. The spring 30 surrounds the electrode 14 and is compressed between the bottom 26 and a collar 32 fixed on the electrode 14 near the upper end thereof. The upper end of the electrode is pressed by the spring 30 against the inner face of the top 34 of an elongated cap 36 which is internally screw-threaded for threaded engagement with the upper portion 24 of the barrel. Since the top of the cap 36 provides a definite stop for the electrode and the spring 30 holds the electrode against that stop, the collet 16 can be maintained in a relaxed position so as to permit longitudinal adjustment of the electrode in either direction by rotation of the cap 36 one way or the other. Thus adjustments of the electrode inward or outward can easily be made by simply turning the cap 36.

I claim:

1. An electric welding torch comprising a barrel having an externally screw-threaded upper portion, an elongated internally threaded cap in threaded engagement with said upper portion of the barrel, a non-consumable electrode within said barrel extending from the upper end of said cap through the lower end of said barrel, and spring means within said barrel yieldingly pressing the upper end of said electrode against the end of said cap.

2. An electric welding torch as described in claim 1, said spring means comprising a collar secured to said electrode near the upper end thereof, and a compressed helical spring having its upper end bearing against said collar and its lower end seated in said barrel.

3. An electrical torch as described in claim 2, a collet in the lower portion of the barrel adapted to grip said electrode, and a sleeve within the barrel manually rotatable to actuate the collet to grip or release the electrode.

References Cited in the file of this patent

UNITED STATES PATENTS

| | | |
|---|---|---|
| 1,319,318 | Bain | Oct. 21, 1919 |
| 2,974,898 | Gibson | June 4, 1957 |